(12) United States Patent
Iyer et al.

(10) Patent No.: US 10,185,298 B2
(45) Date of Patent: Jan. 22, 2019

(54) SMART TOOL MONITORING SYSTEM

(71) Applicant: Applied Materials, Inc., Santa Clara, CA (US)

(72) Inventors: Subramaniam Iyer, Bangalore (IN); Devendrappa Holeyannavar, Bangalore (IN)

(73) Assignee: Applied Materials, Inc., Santa Clara, CA (US)

(*) Notice: Subject to any disclaimer, the term of this patent is extended or adjusted under 35 U.S.C. 154(b) by 304 days.

(21) Appl. No.: 15/084,217

(22) Filed: Mar. 29, 2016

(65) Prior Publication Data

US 2017/0285605 A1  Oct. 5, 2017

(51) Int. Cl.
*G06F 11/30* (2006.01)
*G05B 19/05* (2006.01)

(52) U.S. Cl.
CPC .. *G05B 19/058* (2013.01); *G05B 2219/14006* (2013.01)

(58) Field of Classification Search
CPC .................. G05B 19/058; G05B 2219/14006
See application file for complete search history.

(56) References Cited

U.S. PATENT DOCUMENTS

| | | | |
|---|---|---|---|
| 4,644,320 A | 2/1987 | Carr et al. | |
| 6,853,291 B1 | 2/2005 | Aisa | |
| 6,947,813 B2 | 9/2005 | Sugihara et al. | |
| 2003/0210055 A1 | 11/2003 | Porter et al. | |
| 2005/0171645 A1 | 8/2005 | Oswald et al. | |
| 2010/0023865 A1 | 1/2010 | Fulker et al. | |
| 2014/0244192 A1 | 8/2014 | Craig et al. | |

FOREIGN PATENT DOCUMENTS

| | | |
|---|---|---|
| EP | 2533467 A1 | 12/2012 |
| WO | 2012/035442 A3 | 3/2012 |
| WO | 2014054051 A1 | 4/2014 |

OTHER PUBLICATIONS

PCT International Search Report for PCT/US2017/024624 dated Jul. 7, 2017, 3 pages.
PCT Written Opinion of the International Searching Authority for PCT/US2017/024624 dated Jul. 7, 2017, 9 pages.

*Primary Examiner* — Robert Bachner
(74) *Attorney, Agent, or Firm* — Lowenstein Sandler LLP

(57) ABSTRACT

A method for operating a smart tool monitoring system is described. The method includes monitoring, by a controller within a smart tool monitoring system, a first parameter associated with a first component internal to the smart tool monitoring system. The method also includes determining, by the controller, whether the first parameter satisfies a first criterion. The method also includes performing a first action in response to a determination that the first parameter satisfies the first criterion. The method also includes receiving a measurement value from a sensor of an article of manufacturing equipment that includes a second component external to the smart tool monitoring system. The method also includes determining, by the controller, whether the measurement value satisfies a second criterion. The method also includes performing a second action in response to a determination that the measurement value satisfies the second criterion.

18 Claims, 7 Drawing Sheets

SMART TOOL MONITORING SYSTEM

TECHNICAL FIELD

Implementations of the present disclosure relate to a smart tool monitoring system, and more particularly, to a smart power panel system to monitor the health of manufacturing equipment such as semiconductor manufacturing equipment.

BACKGROUND

In manufacturing systems, it can be beneficial to maximize tool uptime and be able to predict tool failure in order to improve tool availability and customer satisfaction. Conventional manufacturing systems have multiple systems interlinked with one another, where each system is made up of multiple components. Each system is powered by a power panel such as an alternating current (AC) panel, and each power panel is connected to a main control panel via a system of cables. The components include integrated sensors which are connected to the main control panel via cables. This makes it difficult to troubleshoot and diagnose a problem in the event of a system fault because there is no indication of which component caused the fault. This also leads to a large amount of cables being used to connect the power panel and components of each system to the main control panel.

SUMMARY

The following is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

Embodiments described herein provide improved methods, systems and software for smart tool monitoring.

In one embodiment, a method includes monitoring, by a controller within a smart tool monitoring system, a first parameter associated with a first component internal to the smart tool monitoring system. The method also includes determining, by the controller, whether the first parameter satisfies a first criterion. The method also includes performing a first action in response to a determination that the first parameter satisfies the first criterion. The method also includes receiving a measurement value from a sensor of an article of manufacturing equipment that comprises a second component external to the smart tool monitoring system. The method also includes determining, by the controller, whether the measurement value satisfies a second criterion. The method also includes performing a second action in response to a determination that the measurement value satisfies the second criterion Another embodiment may include a system including a control panel and a power panel. The control panel includes a processing device to process system data and a network communication module to communicate the system data to a server. The power panel is coupled to the control panel and provides power to a component of an article of manufacturing equipment. The power panel includes a first port to provide a first data connection to the control panel, a first component internal to the power panel, a first power supply to supply power to a second component of an article of manufacturing equipment, a second port to provide a data connection to a sensor of the article of manufacturing equipment, and a controller, operatively coupled to the first component, to the first port, and to the second port. The controller is to monitor a first parameter associated with the first component. The controller is further to determine whether the first parameter satisfies a first criterion. The controller is further to perform a first action in response to a determination that the first parameter satisfies the first criterion. The controller is further to receive a measurement value from the sensor. The controller is further to determine whether the measurement value satisfies a second criterion. The controller is further to perform a second action in response to a determination that the measurement value satisfies the second criterion. The controller is further to provide the system data to the control panel via the first data connection. The system data includes at least one of the first parameter, the measurement value, the first action, or the second action.

Another embodiment includes an alternating current (AC) power panel. The AC power panel includes a first component, a first power supply, and a controller. The first component is internal to the power panel. The first power supply is to supply power to a second component of an article of manufacturing equipment. The controller is to monitor a first parameter associated with the first component. The controller is further to determine whether the first parameter satisfies a first criterion. The controller is further to perform a first action in response to a determination that the first parameter satisfies the first criterion. The controller is further to receive a measurement value from a sensor of the article of manufacturing equipment. The second component of the article of manufacturing equipment is external to the power panel. The second component is powered by the power panel. The controller is further to determine whether the measurement value satisfies a second criterion. The controller is further to perform a second action in response to a determination that the measurement value satisfies the second criterion.

BRIEF DESCRIPTION OF THE DRAWINGS

The present disclosure is illustrated by way of example, and not by way of limitation, in the figures of the accompanying drawings. Like references indicate similar elements. It should be noted that different references to "an" or "one" implementation in this disclosure are not necessarily to the same implementation, and such references mean at least one.

DETAILED DESCRIPTION

Figure 1:
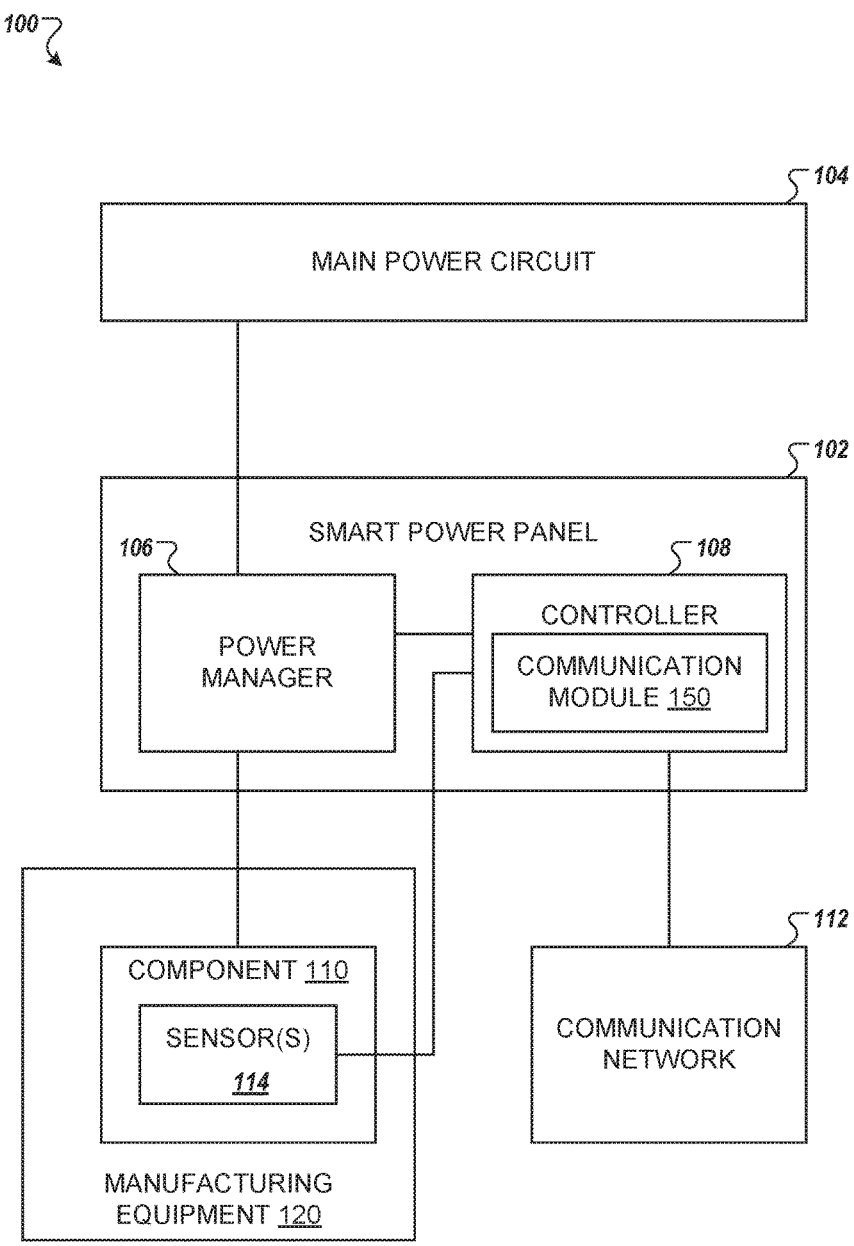
FIG. 1 is a block diagram illustrating one example of a smart power panel connected to a main power circuit.

Embodiments of the present disclosure are directed to a smart tool monitoring system for monitoring parameters of tools and components of a manufacturing system. Implementations of the present disclosure include a system that utilizes smart power panels to provide power to the system components (e.g., contactors, power relays, power supplies, drives, motors, etc.). In some examples, the smart power panels may be alternating current (AC) power panels.

In embodiments described herein, controllers such as programmable logic controllers (PLCs), field-programmable gate arrays (FPGAs), or other types or varieties of controller devices are integrated into smart power panels and/or other components of a smart tool monitoring system. As used herein, a smart power panel is a power panel that includes access to information associated with a manufacturing equipment (e.g., from sensors), rules defining actions to perform under particular circumstances, and processing power to determine when the information satisfies criteria specified in the rules. Accordingly, a smart power panel is a power panel that is able to process information associated with a component that it powers, make decisions based on the processed information, and execute those decisions. Other smart tool elements of a smart tool monitoring system are similarly able to process received information associated with components of manufacturing equipment, make decisions based on the processed information, and execute those decisions.

The smart power panels power components of manufacturing equipment (e.g., components of semiconductor manufacturing equipment). The controllers may be integrated into the smart power panels and may track parameters of the components of the manufacturing equipment that are powered by the smart power panels. Alternatively, the controllers may be integrated into other elements of a smart tool monitoring system, such as robotic arms, sensors, motors, and so forth.

The parameters tracked by the smart tool monitoring system depend on the types of components connected to the smart power panel (or types of components otherwise included in the manufacturing equipment) and how much control is desired. For example, the controller may track parameters of components internal to the smart power panel (or other element of the smart tool monitoring system) and/or components external to the smart power panel. If one or more of the parameters exceeds an acceptable threshold or satisfies an associated criterion, the controller may trigger an action. That triggered action may be as simple as a notification to maintenance personnel or as advanced as an automated response to resolve the situation such as a recalibration of a tool, rerouting of power, controlled shutdown of the component or the manufacturing equipment, or another corrective action.

Examples of parameters tracked by the controller in the smart tool monitoring system (e.g., in the smart power panel) may be a number of cycles, a number of stops and starts, an amount of energy consumed, an elapsed time since a last preventative maintenance was performed, a time since a last calibration was performed, and the like. The controllers integrated in the smart power panels (or other elements of a smart tool monitoring system) may be programmed to generate a notification (e.g., an electronic mail (email) message, a simple messaging service (SMS) message, an automated phone call, a post to a feed or social network account, and so on), reroute system power, switch power supplies, or bring the system to a controlled halt when a parameter meets a predetermined value. The predetermined values are programmed into the PLC or other controller and can be modified through changes to software on the PLC or other controller.

The system can determine and monitor the health of components connected to smart power panels by using sensors provided on the components and/or by monitoring other information that is available to the smart power panels such as current to controlled components. The sensors of the components are connected directly to the corresponding smart power panel of the system. This allows the PLC or other controller integrated into the smart power panel to monitor the parameters of the components contained in the system. The PLC can then determine an overall health of the component based on the parameters.

The smart tool monitoring system can generate a notification in the event that a component is to be calibrated, in the event that the component health has degraded, in the event that a preventative maintenance should be performed, and so on. The PLC or other controller may be programmed to generate a notification stating that a component should undergo calibration, maintenance, etc. in response to a specific component reaching a predetermined parameter. Once that parameter has been met, the PLC or other controller can generate a notification to send to a user informing them that the component is recommended for calibration, maintenance, replacement, etc.

For example, when the cycle count of a component reaches 200,000, the smart tool monitoring system can generate and send an SMS text message to the maintenance engineer of a manufacturing facility to inform them that calibration is recommended. Once calibration has been performed, a cycle count may be manually reset by the maintenance engineer or automatically determined and reset by the controller. In a similar fashion, the smart tool monitoring system can generate a notification in the event that preventative maintenance on a component should be performed. Should maintenance not be performed on the component in a predetermined amount of time, the system can send escalating notifications. The notifications may include system data such as the trigger value (200,000 cycles) and the number of cycles currently counted for the component. For example, if a notification is sent to the maintenance engineer that calibration is recommended and it is not addressed within four hours, the system may send a notification to the plant manager. In some embodiments, the notification is sent via a main control panel which is connected to the smart power panel and to a network. In other embodiments, the smart power panel includes a communication module, such as a Wi-Fi® module, a Bluetooth® module, general packet radio service (GPRS) module with a subscriber identity module (SIM) card, and so on. The communication module may enable the smart power panel to wirelessly send notifications to computing devices such as a maintenance personnel's mobile phone.

The smart tool monitoring system can detect faults in the components of manufacturing equipment as well as faults to the electrical connections to the components of the manufacturing equipment. The smart power panel can be programmed with parameter values that indicate a faulty component. In the example of a motor, the controller can identify, for example, when the motor is going into fault, when the motor is short-circuited, when the motor is overloaded, and/or when an engine circuit for the motor is grounded. In response to a fault or other qualifying condition, the controller can switch power supplies from a first power supply (such as a main power supply) to a second power supply (such as a back-up or failsafe power supply), generate a notification, reroute system power for the component, bring the manufacturing equipment that includes the controller to a controlled halt, or the like.

The smart tool monitoring system can generate reports based on system data such as the parameters being monitored by the smart power panel or other elements of the smart tool monitoring system. The smart power panel can use the measured parameters to generate reports such as daily power consumption reports, utilization reports, calibration and maintenance records and the like.

The smart tool monitoring system described in embodiments has an improved capability of monitoring the health and operating conditions of components controlled by smart power panels. The smart power panels and/or other elements of the smart tool monitoring system in such embodiments are capable of detecting problems and automatically performing actions to respond to those problems. This may minimize tool down time for manufacturing equipment, and may facilitate quick notification to responsible parties. Additionally, the described embodiments provide smart power panels and a control panel that have a simplified wiring and connection between the smart power panels and the control panel. This simplified connection may reduce cost, reduce space usage, and simplify installation and maintenance of manufacturing equipment in embodiments.

FIG. 1 is a block diagram illustrating one example of a smart power panel 102 connected to a main power circuit 104. In some examples, the main power circuit 104 may include a simple (e.g., direct) connection between the smart power panel 102 and a power grid. In other examples, the main power circuit 104 may include a main or central control panel with additional functionality over a simple electrical connection such as overload protection, consumption and/or feedback metering, etc. In the illustrated example, the smart power panel 102 is connected to the main power circuit 104 to receive and monitor a power transmission from the main power circuit 104. The smart power panel 102 further delivers the power from the main power circuit 104 to a component 110 of an article of manufacturing equipment 120.

The article of manufacturing equipment 120 in some embodiments is an article of semiconductor manufacturing equipment. Examples of manufacturing equipment 120 include a plasma etch reactor, a furnace, a vertical thermal reactor, a horizontal thermal reactor, an ion assisted deposition tool, a sputtering tool, a plasma spray deposition tool, a photolithography tool, a wafer cleaning tool, a laser cutting tool, a scanning electron microscope, and so on. The manufacturing equipment 120 may be an ion implanter, an etch reactor, a photolithography device, a deposition device (e.g., for performing chemical vapor deposition (CVD), physical vapor deposition (PVD), ion-assisted deposition (IAD), and so on), or other tool or device for the manufacturing of semiconductor wafers or other products, items, or services. The component 110 may be a motor, heating system, robotics system, gas delivery system, plasma generation system, fluid delivery system, cooling system, vacuum system, wafer delivery system, or other component of the manufacturing equipment 120. The manufacturing equipment 120 may include multiple different components, and some or all of the different components may be powered by a smart power panel.

The smart power panel 102 may be an alternating current (AC) power panel that performs standard power panel functions. For example, the smart power panel 102 may provide an electrical power feed into one or more circuits, and may provide a separate protective fuse or circuit breaker for each of the one or more circuits. The smart power panel 102 may additionally include features such as overcurrent protection (RCBO).

In one embodiment, smart power panel 102 includes a power manager 106 and a controller 108. The power manager 106 may be connected to the main power circuit 104 and to a component 110 to receive power and communicate the power to the component 110. The power manager 106 may include one or more electrical components to facilitate the management of the power transmission to the component 110. For example, the power manager 106 of the smart power panel 102 may include one or more smart contactors to track a parameter such as number of cycles, voltage, current, time under power, etc. These smart contactors may keep track of a number of cycles of use, and may report this information to controller 202. The power manager 106 may include other internal components such as a power relay, a power source, a breaker, a fuse, or other component to monitor one or more parameters of the smart power panel 102 and/or component 110.

In some examples, the power manager 106 is coupled to the controller 108. The controller 108 may include one or more of a programmable logic controller (PLC), a field-programmable gate array (FPGA), or other type or variety of controller. In some examples, the controller 108 may include ports to monitor the parameters of the power panel 102 by interpreting intercepted or received signals originating from the power manager 106 or ports to monitor signals from the component 110. For example, the controller 108 may track parameters of components such as a motor, a drive assembly, a tool, etc. or sensor 114 attached to or integrated with one of these components 110.

In traditional systems, control circuits are implemented in hardware, which can be costly and difficult to upgrade. In contrast, the controller 108 in embodiments includes a programmable hardware module that can be programmed to include the control circuits (e.g., a PLC or FPGA). Thus, the rules for monitoring and responding to inputs can be changed by updating a firmware, software, or FPGA configuration of the controller 108. This may improve a flexibility of the smart power panel 102. Additionally, the smart power panel 102 in embodiments is up to 50% smaller than traditional power panels.

In some examples, the controller 108 may compare the parameters of the components against corresponding criteria in one or more rules. The criteria and/or rules may be stored locally at the controller 108 or centrally. For example, the controller 108 may include a memory (e.g., read-only memory (ROM), flash memory, dynamic random access memory (DRAM), static random access memory (SRAM), etc.) that stores rules that include the criteria and actions to perform responsive to satisfaction of the criteria. Alternatively, the controller 108 may access a memory external to the controller 108. Examples of criteria include upper thresholds, lower thresholds, time limits, maximum deltas between received values and expected values, maximum standard deviations, and so on.

The criteria may be organized in lookup tables or other formats. In comparing the parameters against the criteria, the controller 108 may determine whether the criteria are satisfied. In some cases, the criteria may include thresholds of operation or specific values. For example, the criteria associated with the power manager 106 may relate to a number of cycles (e.g., a number of cycles of an actuation of an arm, rotations of a motor, operation completions, etc.), a number of stops and starts (e.g., a number of stops and starts of a motor), an amount of energy consumed (e.g., an amount of energy consumed by component 110), a time or amount of usage since a last preventative maintenance was performed (e.g., a time since component 110 or manufacturing equipment 120 underwent maintenance, a number of wafers that have been processed since a last maintenance), a time since a last calibration was performed (e.g., a time since the component 110 and/or manufacturing equipment was last calibrated, number of wafers processed since a last calibration was performed), and the like. Criteria relating to the component 110 may be similar to that described above or may alternatively or additionally include component temperature, resistance, load, speed, orientation, or other health, maintenance, or repair, or similar parameters. Embodiments enable maintenance and calibration of components and manufacturing equipment to be scheduled based on an event cycle (e.g., number of wafers processed) rather than a time cycle. This can ensure that equipment is not powered down for calibration or maintenance unnecessarily, and that equipment receives calibration and/or maintenance on a timely bases or when called for.

If the controller 108 is able to determine an overall health of the component 110 based on the received parameters. If controller 108 determines that the health of the component 110 is below a desired value, controller 108 can perform one or more operations to improve the equipment health. If controller 108 determines that a criterion in a rule is satisfied, an action specified in the rule may be initiated. The action may include sending a signal to a central controller, sending a notification or message via a communication network to a computing device or human recipient, performing a maintenance action such as a recalibration or a realignment, performing a bypass action such as a tool change or activation of a secondary system (such as a secondary contactor, a secondary switch, a secondary power source, a secondary sensor, a secondary workflow route, etc.), or initiate a controlled stop of the component 110 or the manufacturing equipment 120.

In some examples, the controller 108 may send a message to a first human recipient such as a maintenance technician instead of or in addition to the actions described above. In some examples, the controller 108 may send the message and initiate a timer. If the controller 108 does receive data indicating that action has been taken before expiration of the timer, the controller 108 may send a second message to an individual with increased authority such as a managing engineer. The escalation of notifications may continue based on time, number of cycles since sending the message, satisfying further criteria, or other triggers.

In embodiments, the controller 108 enables the smart power panel to perform self-diagnostics and diagnostics of powered components and/or equipment. Since the smart power panel 102 that includes the controller 108 is directly connected to the powered components, the controller 108 can make near instantaneous decisions to perform actions such as halting a robotic arm that is out of calibration and about to damage itself or other components, or throttle down a heater that is heating a chamber over a designated temperature, or initiate automatic calibration of the component, or schedule planned maintenance for the component. Each health signal (e.g., sensor measurement or other parameter) may trigger an automated action. The acquisition and analysis of operational data (e.g., number of wafer transfers, number of starts and stops, energy consumed, power consumed, etc.), service data (e.g., when was a last preventative maintenance done, which components were replaced in the last maintenance, current health level of components, etc.) and diagnostics data (e.g., current status of tool health, etc.) increases system availability, reduces scrapped product, and improves tool life.

In some examples, the controller 108 may include a communication module 150 to connect to a communication network 112. The communication module 150 may include a data port for a wired or wireless network adapter (also referred to as a network interface controller (NIC)). For example, the communication module 150 may be an Ethernet adapter, a Wi-Fi adapter, a GPRS adapter, a global system for mobile communications (GSM) adapter, a long term evolution (LTE) adapter, a universal mobile telecommunications system (UTMS) adapter, a Bluetooth® adapter, a Zigbee® adapter, and so on. The communication network 112 may include a local area network (LAN), and may be part of an equipment automation layer that may include routers, gateways, servers, data stores, etc. The communication module 150 may connect to the network 112 via a data port, a wireless interface, a SEMI Equipment Communications Standard/Generic Equipment Model (SECS/GEM) interface, an Ethernet interface, and/or another type or specific manner of port or interface. In one embodiment, the communication module 150 enables rules, intercepted or received data, alerts, messages, and/or other information to be communicated to another system or device without relying on a main controller and/or main power circuit 104.

In some examples, the controller 108 may generate a report or other collection/presentation of information. The reports may be organized into time periods and/or categories. For example, the controller 108 may generate daily power consumption reports, utilization reports, calibration and maintenance records, etc. Other implementations may include more or less functionality. The communication module 150 may then transmit the report to one or more additional systems.

In the illustrated example, the smart power panel 102 is connected to the component 110. The component 110 may receive power from the power manager 106. The controller 108 may monitor the power consumption of the component 110 by monitoring a parameter of the power manager 106 for irregularities. For example, controller 108 may monitor a current of power manager 106, a voltage for power manager 106, a resistance of a load connected to power manager 106, and/or other parameters of power manager 106. Controller 108 may also monitor other parameters of power manager 106, such as a number of cycles of a relay or connector, a number of days in operation, line noise at the power manager 106, and so on. The controller 108 may also be connected directly to the component 110 or to one or more sensors 114 of the component.

The one or more sensors 114 may be attached to or positioned so as to detect a parameter of the component 110. The sensors 114 may relay the detected information to the controller 108 or store the information in a storage location where the controller 108 may access the information and track a parameter of the component 110. Other examples may include other manners of providing the information relating to a parameter of the component 110 to the controller 108.

Controller 108 may receive sensor measurements from the one or more sensors 114, and may compare the sensor measurements to historical sensor measurement values, to expected measurement values, to minimum and/or maximum permitted values set forth in rules, and so on. In this manner, the controller 108 may track a parameter of the component 110 directly or indirectly. Controller 108 may then compare the parameters a measured from power manager 106 and/or additional parameters received from sensors 114 to one or more stored rules. If any of the parameters satisfies a criterion in a rule, controller 108 may perform an action specified in the rule.

Figure 2:
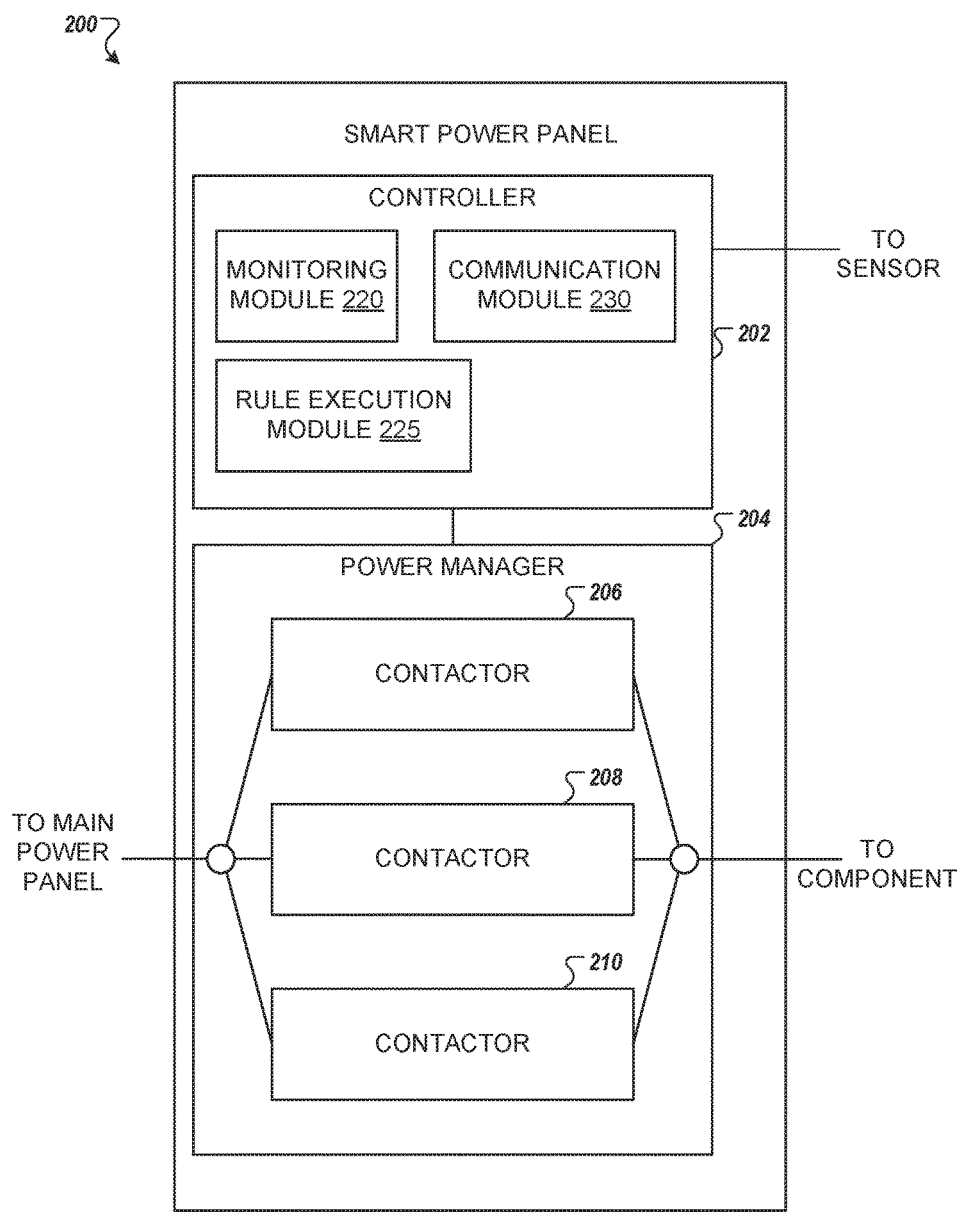
FIG. 2 is a block diagram illustrating one example of a smart power panel.

FIG. 2 is a block diagram illustrating one example of a smart power panel 200. In the illustrated example, the smart power panel 200 includes a controller 202 and a power manager 204. In some examples, the smart power panel 200 is similar to the smart power panel 102 described above with reference to FIG. 1. Power manager 204 connects at one end to a main power panel and connects at another end to a component of an article of manufacturing equipment that is powered by smart power panel 200. Controller connects to power manager 204 and additionally connects to at least one sensor of the article of manufacturing equipment.

The example depicted in FIG. 2 includes a power manager 204 with a plurality of contactors 206, 208, and 210. In one example, the contactors 206, 208, and 210 may be smart contactors capable of returning a signal to the controller 202 relating to number of cycles, active time, inactive time, power transmitted, etc. In some examples, the controller 202 may provide instructions to the power manager 204 to select which of the contactors 206, 208, and 210 to use to pass the power along to a powered component. For example, if the controller 202 determines that the first contactor 206 has satisfied a criterion detailing a maximum number of cycles, the controller 202 may instruct the power manager 204 to begin using the second contactor 208. Another example may include cycling through the contactors 206, 208, and 210 to prevent overuse of a single contactor within the group. In another example, controller 202 may determine when a contactor is about to fail, and may send an instruction to power manager 204 to cause power manager 204 to switch to another contactor prior to failure of the active contactor. Other scenarios and criteria may be provided to the controller 202 and used by the controller 202 to take an action.

In one embodiment, controller 202 includes a monitoring module 220, a rule execution module 225 and a communication module 230. Each of the modules 220, 225, 230 may be hardware, firmware, software, or a combination thereof. Communication module 230 may correspond to communication module 150 of FIG. 1.

Monitoring module 220 receives input from power manager 204 and from sensors of manufacturing equipment. The input from power manager 204 may be parameters detected or measured by power manager 204. The input from the sensors may be parameters (e.g., sensor measurements) generated by those sensors. Monitoring module 220 may store the parameters from the power manager 204 and sensors in a memory (not shown) of controller 202. Monitoring module 220 may additionally send the parameters to a main control circuit. Additionally, or alternatively, monitoring module 220 may send the parameters to a network server via communication module 230.

Rule execution module 225 analyzes received parameters (e.g., received sensor measurements from sensors and/or received values from power manager 204) and compares those parameters to one or more stored rules. Each rule may include one or more criteria and one or more actions to take if the criteria are satisfied. A rule may have a single criterion associated with a single parameter or may have multiple criteria associated with different parameters. For example, a first rule may have a single criterion associated with a current parameter from power manager 204. A second example rule may have a first criterion associated with the current parameter from power manager 204 and a second criterion associated with a voltage parameter from power manager 204. A third example rule may have a criterion associated with a temperature from a temperature sensor. A fourth example rule may have a first criterion associated with a first sensor and a second criterion associated with a second sensor. A fifth example rule may have a first criterion associated with a parameter from power manager 204 and a second criterion associated with a parameter from a sensor.

Each rule further includes one or more actions to perform if the criterion or criteria of that rule are satisfied. The specific action to perform may vary based on the nature of the parameters used as input, the nature of the rule, the nature of the component that is powered and/or the nature of the sensors from which sensor measurements are received. Examples of actions include sending notifications or other messages, performing maintenance, replacing parts, performing calibration, shutting down equipment, switching to alternate components, and so forth.

Figure 3:
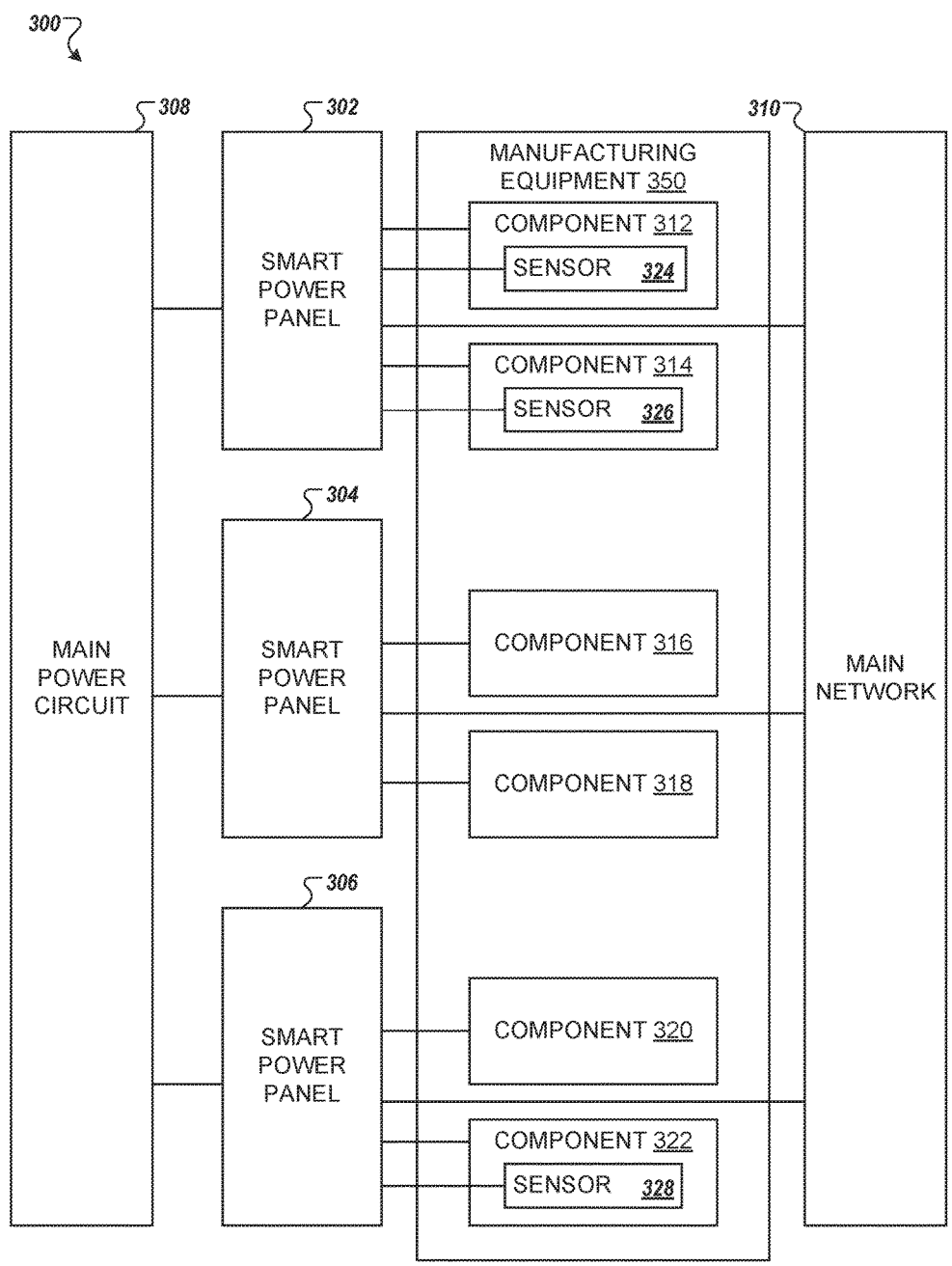
FIG. 3 is a block diagram illustrating one example of a system of a plurality of smart power panels connected to a main power circuit and a main network.

FIG. 3 is a block diagram illustrating one example of a smart tool monitoring system 300 including a plurality of smart power panels 302, 304, and 306 connected to a main power circuit 308 and a main network 310. In the illustrated example, the smart power panels 302, 304, and 306 are each connected to a main power circuit 308. The smart power panels 302, 304, and 306 are also connected to corresponding components 312, 314, 316, 318, 320, 322 of an article of manufacturing equipment 350. Alternatively, different smart power panels 302, 304, 306 may be connected to components of different articles of manufacturing equipment.

In the illustrated embodiment, the first smart power panel 302 is connected to two components 312 and 314. The smart power panel 302 may provide power to each of the components 312 and 314. Additionally, the smart power panel 302 may receive information from the components 312 and 314 relating to the health and other parameters of the components 312 and 314. As illustrated, the first power panel 302 is also in communication with sensors 324 and 326 of the components 312 and 314. Alternatively, the sensors 324, 326 may be sensors of the manufacturing equipment 350 generally, but may not be sensors of the components 312, 314. Examples of sensors include flow rate sensors, temperature sensors, pressure sensors, optical sensors (e.g., still cameras and/or video cameras), acoustic sensors (e.g., microphones), vibration sensors, proximity sensors, force sensors, position sensors (e.g., that measure position, angle, displacement, distance, speed, acceleration, rotation, and so on), motion sensors (e.g., accelerometers), radiation sensors, chemical sensors, and so on. The power panel 302 may receive information (e.g., sensor measurements) from each of these sensors 324 and 326 regarding the health or other parameters of the components 312 and 314 and/or of the manufacturing equipment 350. Smart power panel 302 may analyze the sensor measurements against one or more rules, and determine corrective action to take based on a result of the analysis.

Additionally, the power panel 302 is connected to the main network 310. In some examples, the power panel 302 may send information or notifications to the main network 310. These notifications and/or other information may be sent using a communication module of the smart power panel 302. In other examples, the power panel 302 may also receive information from the main network 310 such as a request to produce a status report or instructions to perform an action.

The second power panel 304 is connected to further components 316 and 318. As neither of these components 316 and 318 have corresponding sensors, the second power panel 304 receives information directly from the components 316 and 318. The second power panel 304 may also communicate that information or allow the information from the components 316 and 318 to be communicated to the main network 310.

The third power panel 306 is also coupled to additional components 320 and 322. The first component 320 associated with the third panel 306 does not have a corresponding sensor while the other component 322 does include a sensor 328. In some examples, a smart power panel may have a single corresponding component, two corresponding components (as shown in FIG. 3), or more than two corresponding components.

In another example, the smart power panels 302, 304, and 306 may include additional smart power panels (not shown) downstream from one or more of the smart power panels 302, 304, and 306. For example, the first power panel 302 may be connected to an intermediate power panel between the first power panel 302 and the component 312. In this example the intermediate power panel may directly control the component 312 and communicate parameters to the first power panel 302. In this manner, the accuracy of error reporting may be increased and reporting may be done in a more general or specific granularity. Other examples may include other arrangements of power panels, components, sensors, and connections to the main power circuit or the main network.

In some examples, each of the smart power panels 302, 304, and 306 may send notifications out via the main network 310. These notifications may include the escalating notification described above. Other types of communication may send out to or received from the main network 310.

Figure 4:
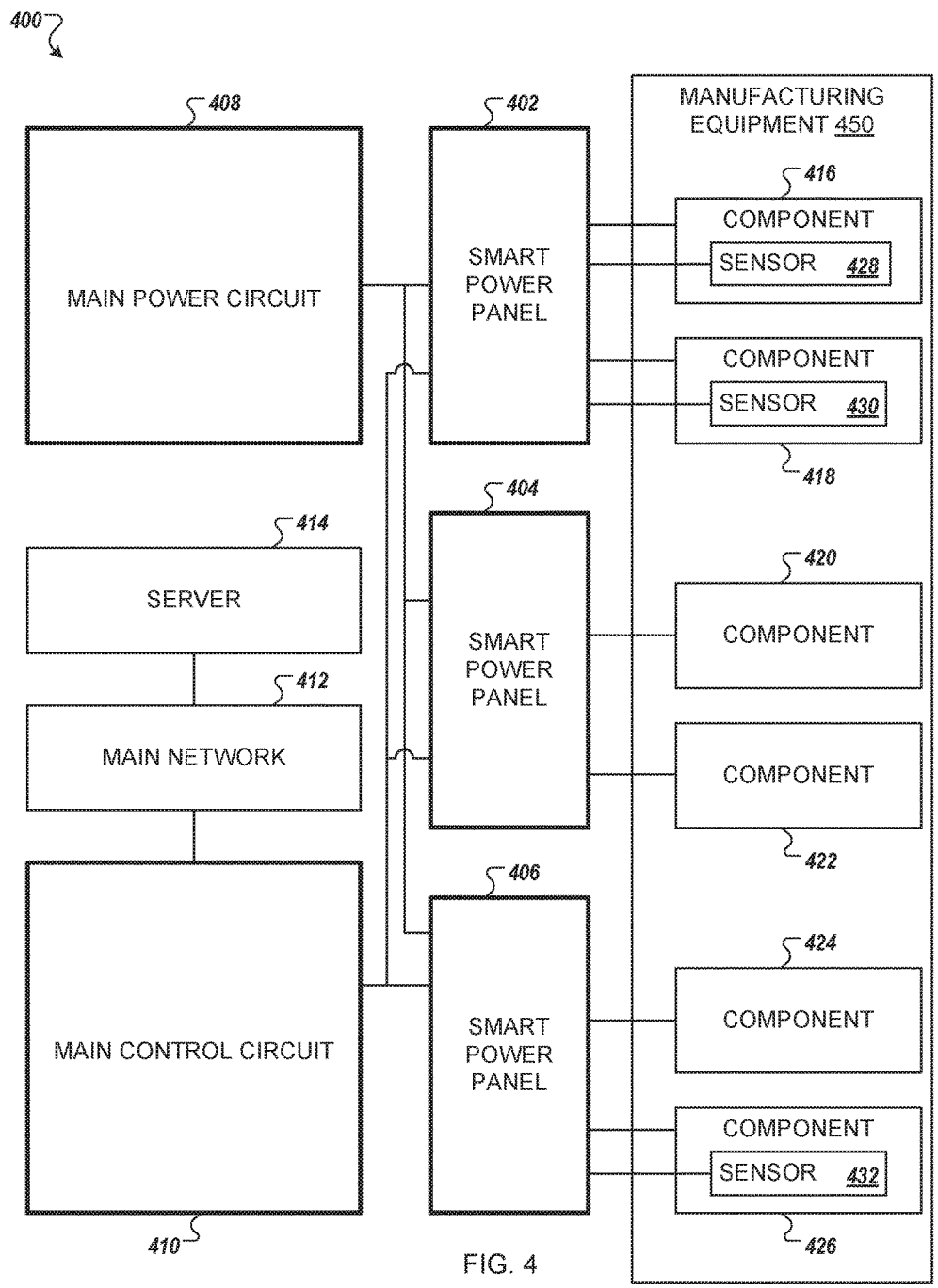
FIG. 4 is a block diagram illustrating another example of a system of multiple smart power panels connected to a main power circuit and a main control circuit.

FIG. 4 is a block diagram illustrating another example of a smart tool monitoring system 400 of plurality of smart power panels 402, 404, and 406 connected to a main power circuit 408 or other power supply and a main control circuit 410. In the illustrated example, the smart power panels 402, 404, and 406 provide power from the main power circuit 408 to each of the corresponding components 416, 418, 420, 422, 424, and 426. Additionally, the smart power panels 402, 404, 406 may connect to sensors 428, 430, and 432, and may receive sensor measurements from the sensors. Additionally, the smart power panels 402, 404, and 406 may return the information (e.g., results of analyzing sensor measurements to rules, sensor measurements, parameters received from components internal to the smart power panels 402, 404, 406, etc.) via data ports of the individual of the power panels to the main control circuit 410.

Rather than having automated intelligence resident solely on the main control circuit 410, automated intelligence may be distributed locally to smart power panels 402, 404, 406. This reduces a size and complexity of wiring and connections between the smart power panels 402, 404, 406 and the main control circuit 410 because sensor data does not need to travel from the sensors 428, 430, 432 directly to main control circuit 410. Instead, sensor measurements may be sent to the smart power panels 402, 404, 406, which may act on the sensor measurements without querying main control circuit 410. In one embodiment, a data connection between smart power panels 402, 404, 406 and main control circuit 310 is a simple communicate IC bus. Even if a connection between the main control circuit 410 and the smart power panels 402, 404, 406 is terminated, the smart power panels 402, 404, 406 are still able to perform operations on the components (e.g., bring the components to a controlled halt) and send notifications (e.g., using internal communication modules). Accordingly, smart power panels 402, 404, 406 may be considered to be internet-of-things (IoT) devices.

The main control circuit 410 may include a processing device to process system data sent from the smart power panels 402, 404, and 406 and a network communication module to send the received information to main network 412 for notification, such as the escalating notification described above, or for storage on a storage device such as a storage device of server 414. In some examples, the smart power panels 402, 404, and 406 may provide individual reports on the corresponding components 416, 418, 420, 422, 424, 426 to the main control circuit 410. The main control circuit 410 may provide addition functionality of interpreting the reports from the smart power panels 402, 404, and 406 and providing a list of warnings or notification to be sent out via the main network 412 or stored to the server 414. Other manners of handling and processing the information from the smart power panels 402, 404, and 406 may also be incorporated.

Figure 5:
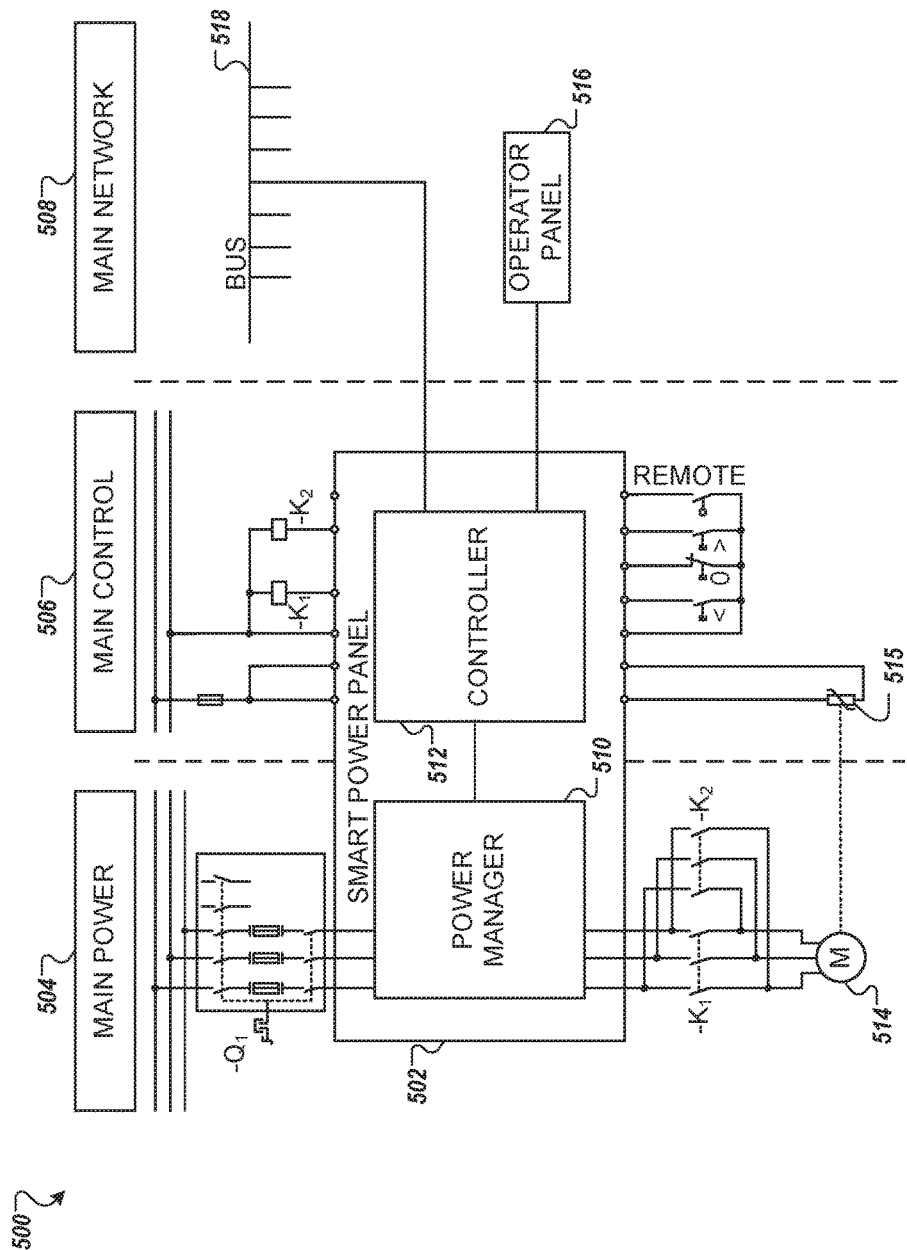
FIG. 5 is a schematic illustrating one example of a system including a smart power panel connected to a main power circuit, a main control circuit, and a main network.

FIG. 5 is a schematic illustrating one example of a smart tool monitoring system 500 including a smart power panel 502 connected to a main power circuit 504, a main control circuit 506, and a main network 508. The illustrated schematic depicts an example of the smart power panel 502 which includes a power manager 510 and a controller 512. The power manager 510 is connected to the main power circuit 504. The power manager 510 receives power from the main power circuit 504 and transmits the power to a component, such as a motor 514. The power manager 510 may be in communication with or include a contactor, a power relay, a breaker, a fuse, or other component (e.g., $-K_1$ through $-K_2$) to monitor the flow of power to the motor 514. For example, the power manager 510 may monitor the power transmission to detect a ground fault or short within the motor 514 or other component within the flow of power. Responsive to detecting a ground fault or short, controller 512 may halt the motor 514.

The smart power panel 502 also includes a controller 512. In the illustrated example, the controller 512 is coupled to the main control circuit 506. The controller 512 determines the health of the motor 514 by receiving signals from a sensor such as a sensor 515 to detect a state of the motor or provide control signals to the motor 514. For example, the sensor 515 may be a temperature sensor or a vibration sensor. In some other examples, the sensor 515 may be a thermistor, varistor, or other type of electrical, chemical, optical, thermal, or other sensor. The controller 512 may receive a parameter from the sensor 515 and compare the parameter with a criterion in a rule to determine if an action should be taken.

In some examples, the controller 512 may display a notification or alert to an operator panel 516. The operator panel 516 may be a display panel at a component, such as a system associated with the motor 514, at the smart power panel 502, at a monitoring station, or at another location. Additionally, the controller 512 may perform actions such as halting the motor, slowing down the motor, speeding up the motor, and so on. In one example, the sensor 515 is a temperature sensor. Controller 512 may receive a temperature measurement, and determine whether the temperature measurement exceeds a temperature threshold. If the temperature measurement exceeds the temperature threshold, then controller may slow down the motor or turn off the motor.

The controller 512 may provide information to the main network 508 for communication to other systems or to a human recipient. In the illustrated example, the controller 512 is coupled to a bus 518 to facilitate communication with the network, a central controller, or other devices such as the server 414 of FIG. 4. Other examples may include fewer or more components to provide less or additional functionality.

Figure 6:
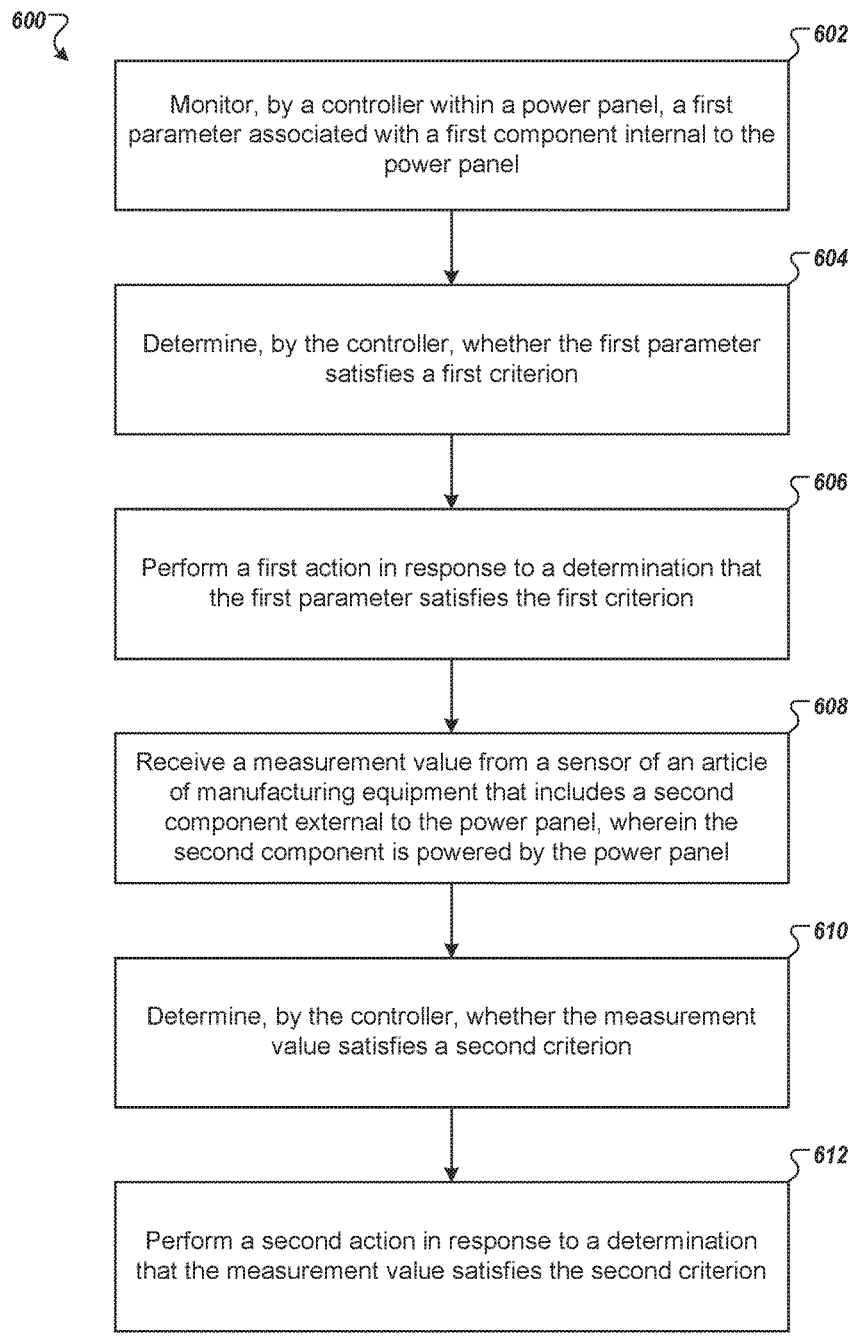
FIG. 6 is a flowchart diagram illustrating one example of a method for operating a smart power panel.

FIG. 6 is a flowchart diagram illustrating one example of a method 600 for operating a smart power panel. The method 600 may be performed by a processing logic that includes hardware (e.g., circuitry, dedicated logic, programmable logic, microcode, etc.), software (e.g., instructions run on a processing device to perform hardware simulation), or a combination thereof. At block 602 of the method 600, the controller, such as controller 512 of FIG. 5, monitors a first parameter associated with a first component internal to the power panel. The first component may be, for example, a smart contactor, a power supply, and so on. The first parameter may include a number of cycles, number of stops and starts, energy consumed, time since last preventative maintenance performed, time since last calibration was performed, and the like. The controller may monitor these parameters on a constant or periodic basis. In some examples, the controller may receive a constant feed of information from which it may identify the parameters. In other examples, the controller may request information periodically and receive the information or parameters in response to a request.

At block 604, the controller determines whether the first parameter satisfies a first criterion. This may include comparing the first parameter to a rule that includes the first criterion. In some examples, the controller may include a storage device to store one or more rules containing the criteria against which the first parameter may be compared. In another example, the controller may access a location remote to the controller to retrieve the corresponding criterion and/or rule and compare the first parameter to the retrieved criterion.

At block 606, the smart power panel may perform a first action in response to a determination that the first parameter satisfies the first criterion. In some examples, the first action may include generating a notification, performing a calibration or maintenance, switching to a secondary resource (e.g., switching to a secondary power supply in the smart power panel), initiating a controlled shutdown, etc.

At block 608, the controller may receive a measurement value from a sensor of an article of manufacturing equipment that includes a second component external to the power panel. The second component is powered by the power panel. In some examples, the sensor may be a sensor to detect a temperature, a speed, an alignment, or other parameter of the second component. The second component may be a tool, such as a motor, a part holder, a feeder, or other tool or component of an article of manufacturing equipment.

At block 610, the controller may determine whether the measurement value satisfies a second criterion. This criterion may include any variable that may be related to the second components mentioned above. In some examples, the measurement value may be a measure of component temperature, resistance, load, speed, orientation, or other health, maintenance, or repair, or similar data.

At block 612, the smart power panel may perform a second action in response to a determination that the measurement value satisfies the second criterion. In some examples, the second action may be similar to the first action described above. In other examples, the second action may include a notification or escalating notification, a calibration or maintenance, switching to a secondary resource, initiating a controlled shutdown, etc.

Figure 7:
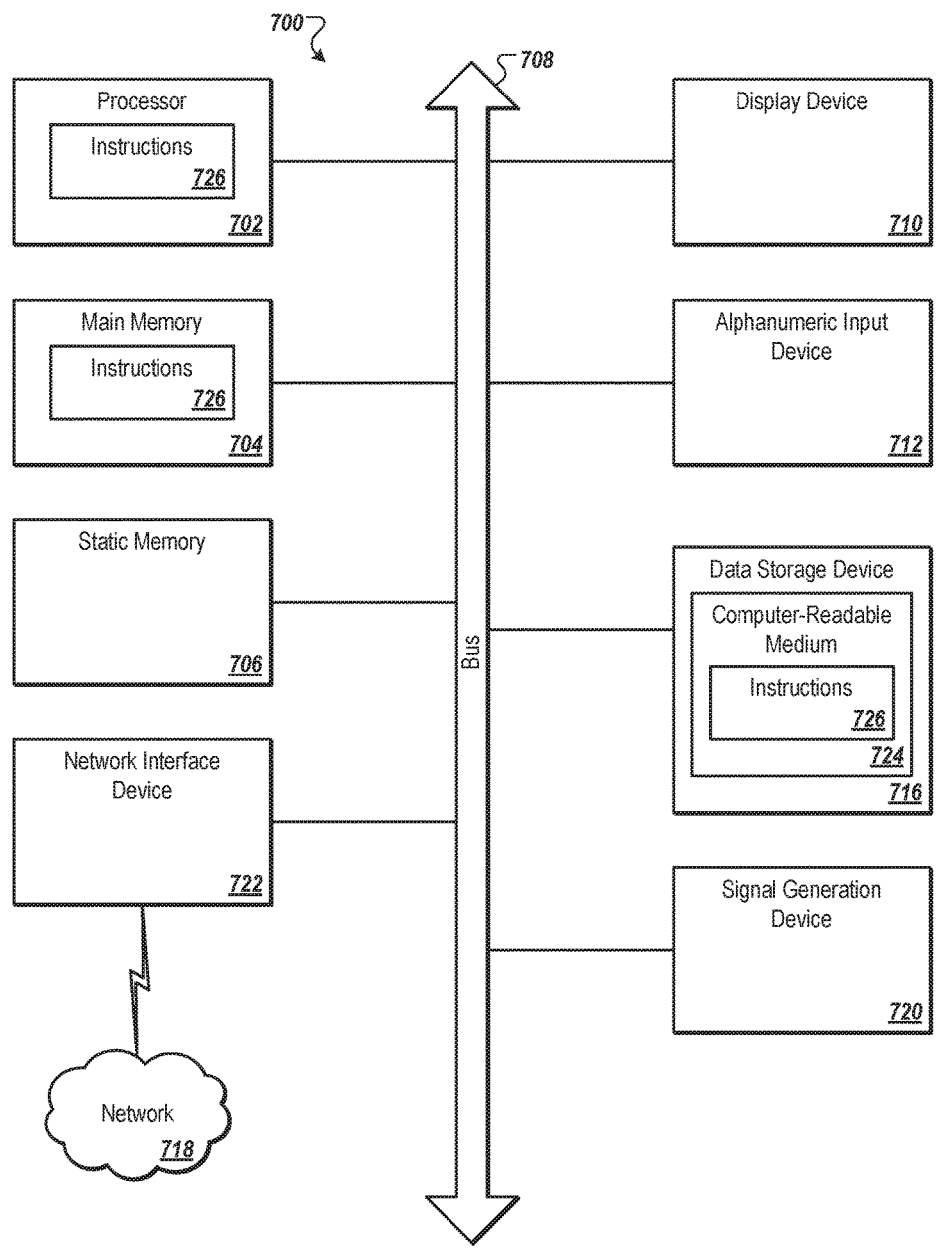
FIG. 7 is a block diagram illustrating one example of a machine in the form of a computing system for smart tool monitoring.

FIG. 7 is a block diagram illustrating one example of a machine in the form of a computing system 700 for smart tool monitoring. Within the computing system 700 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PLC, a FPGA, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for malicious non-human user detection, such as the methods described above. The computing system 700 represents various components that may be implemented in the devices described herein.

The exemplary computing system 700 includes a processing device 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a data storage device 716, each of which communicate with each other via a bus 708.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device &02 may also be one or more special-purpose processing devices such as an application specific integrated circuit (ASIC), a field programmable gate array (FPGA), a digital signal processor (DSP), network processor, or the like. The processing device 702 is configured to execute the processing logic (e.g., smart tool monitoring instructions 726) for performing the operations and steps discussed herein.

The computing system 700 may further include a network interface device 722. The computing system 700 also may include a display device 710 (e.g., a liquid crystal display (LCD) or a cathode ray tube (CRT)), an alphanumeric input device 712 (e.g., a keyboard), and a signal generation device 720 (e.g., a speaker).

The data storage device 716 may include a computer-readable storage medium 724 on which is stored one or more sets of instructions (e.g., instructions 726) embodying any one or more of the methodologies or functions described herein. The instructions 726 for smart tool monitoring may also reside, completely or at least partially, within the main memory 704 and/or within the processing device 702 during execution thereof by the computing system 700, the main memory 704 and the processing device 702 also constituting computer-readable storage media. The instructions 726 may further be transmitted or received over a network via the network interface device 722.

While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media or other types of mediums for storing the instructions. The term "computer-readable transmission medium" shall be taken to include any medium that is capable of transmitting a set of instructions for execution by the machine to cause the machine to perform any one or more of the methodologies of the present embodiments.

Components, and other features described herein (for example in relation to FIGS. 1-7) can be implemented as discrete hardware components or integrated in the functionality of hardware components such as ASICS, FPGAs, DSPs, PLCs, or similar devices.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "correlating", "calculating", "providing", "performing," "analyzing," "modifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments herein also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method of improving availability of an article of manufacturing equipment by a power panel, the method comprising:

monitoring, by a controller within the power panel, a first parameter associated with a contactor or a power supply internal to the power panel, wherein the first parameter comprises power consumption of the article of manufacturing equipment that is powered by the power panel;

determining an acceptable power consumption range for the article of manufacturing equipment;

determining, by the controller, whether the power consumption is outside of the acceptable power consumption range;

performing a first action in response to a determination that the power consumption of the article of manufacturing equipment is outside of the acceptable power consumption range, wherein the first action is selected from a group consisting of: generating a notification, performing a calibration, initiating maintenance, switching to a secondary power supply, or initiating a controlled shutdown;

receiving a measurement value from a sensor of the article of manufacturing equipment;

determining, by the controller, whether the measurement value satisfies a second criterion; and performing a second action in response to a determination that the measurement value satisfies the second criterion.

2. The method of claim 1, wherein performing at least one of the first action or the second action comprises:

sending a first notification to a first recipient using a communication module;

determining whether corrective action associated with the first notification has been completed within a specified time period; and responsive to a determination that the corrective action has not been completed in the specified time period, sending a second notification to a second recipient of increased authority using the communication module.

3. The method of claim 1, wherein performing at least one of the first action or the second action comprises initiating a calibration of the article of manufacturing equipment.

4. The method of claim 1, wherein the second criterion comprises a predefined threshold of operation for a second component of the article of manufacturing equipment.

5. A tool monitoring system configured to improve availability of an article of manufacturing equipment, comprising:
- a control panel comprising:
  - a processing device to process system data; and
  - a network communication module to communicate the system data to a server; and
- a power panel, coupled to the control panel, to provide power to a component of the article of manufacturing equipment, the power panel comprising:
  - a first port to provide a first data connection to the control panel;
  - a first component internal to the power panel;
  - a first power supply to supply power to a second component of the article of manufacturing equipment;
  - a second port to provide a data connection to a sensor of the article of manufacturing equipment; and
  - a controller, operatively coupled to the first component, to the first port, and to the second port, to:
    - monitor a first parameter associated with the first component;
    - determine whether the first parameter satisfies a first criterion;
    - perform a first action in response to a determination that the first parameter satisfies the first criterion, wherein the first action is selected from a group consisting of: generating a notification, performing a calibration, initiating maintenance, switching to a secondary power supply, or initiating a controlled shutdown;
    - receive a measurement value from the sensor;
    - determine whether the measurement value satisfies a second criterion;
    - perform a second action in response to a determination that the measurement value satisfies the second criterion; and
    - provide the system data to the control panel via the first data connection, wherein the system data comprises at least one of the first parameter, the measurement value, the first action, or the second action.

6. The system of claim 5, wherein performing at least one of the first action or the second action comprises at least one of:
- initiating a calibration of at least a portion of the article of manufacturing equipment; or
- initiating a controlled shutdown of at least a portion of the article of manufacturing equipment.

7. The system of claim 5, wherein the first component of the power panel comprises a smart contactor and the first action comprises switching from the first power supply to a second power supply in response to a determination that the first parameter, comprising operational data generated by the smart contactor, satisfies the first criterion.

8. The system of claim 5, wherein at least one of the first parameter or the measurement value comprises at least one of:
- a number of cycles of the second component;
- a number of stops and starts of the second component;
- power consumed by the second component;
- a time since last maintenance of the second component;
- a time since last calibration of the second component; or
- an irregularity in power consumption by the second component.

9. The system of claim 5, wherein at least one of the first criterion or the second criterion comprises a predetermined threshold of operation for the first component or the second component stored in the controller.

10. An alternating current (AC) power panel configured to improve availability of an article of manufacturing equipment, comprising:
- a first component internal to the AC power panel;
- a first power supply to supply power to a second component of the article of manufacturing equipment; and
- a controller to:
  - monitor a first parameter associated with the first component;
  - determine whether the first parameter satisfies a first criterion;
  - perform a first action in response to a determination that the first parameter satisfies the first criterion, wherein the first action is selected from a group consisting of: generating a notification, performing a calibration, initiating maintenance, switching to a secondary power supply, or initiating a controlled shutdown;
  - receive a measurement value from a sensor of the article of manufacturing equipment;
  - determine whether the measurement value satisfies a second criterion; and
  - perform a second action in response to a determination that the measurement value satisfies the second criterion.

11. The AC power panel of claim 10, wherein performing at least one of the first action or the second action comprises providing a notification to perform maintenance on the first component or the article of manufacturing equipment.

12. The AC power panel of claim 11, wherein performing at least one of the first action or the second action comprises:
- sending a first notification to a first recipient using a communication module of the AC power panel;
- determining whether corrective action associated with the first notification has been completed within a specified time period; and
- responsive to a determination that the corrective action has not been completed in the specified time period, sending a second notification to a second recipient of increased authority using the communication module.

13. The AC power panel of claim 10, wherein the second action comprises initiating a controlled shutdown of the second component.

14. The AC power panel of claim 10, wherein the first component of the AC power panel comprises a smart contactor to provide operational data for the smart contactor to the controller.

15. The AC power panel of claim 14, wherein the first parameter comprises the operational data for the smart contactor.

16. The AC power panel of claim 15, wherein the first action comprises switching from the first power supply to a second power supply.

17. The AC power panel of claim 10, wherein the AC power panel is connected to a central control panel.

18. The AC power panel of claim 10, wherein at least one of the first parameter or the measurement value comprises at least one of:
- a number of cycles of the second component;
- a number of stops and starts of the second component;
- power consumed by the second component;
- a time since last maintenance of the second component;
- a time since last calibration of the second component; or an irregularity in power consumption by the second component.

\* \* \* \* \*